United States Patent
Blum et al.

(10) Patent No.: US 6,234,115 B1
(45) Date of Patent: *May 22, 2001

(54) NESTING BOX FOR EXCRETA COLLECTION FROM NESTING DAMS THROUGH PARTURITION AND LACTATION

(75) Inventors: Carmen A. Blum, St. Charles, MO (US); Maryka H. Bhattacharyya, Naperville; Allison K. Wilson, Elmhurst, both of IL (US)

(73) Assignee: The University of Chicago, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,510

(22) Filed: Aug. 6, 1998

(51) Int. Cl.[7] .................. A01K 1/02; A01K 1/03; A01K 31/06

(52) U.S. Cl. .................. 119/472; 119/452; 119/473; 119/417

(58) Field of Search .................. 119/417, 452, 119/454, 455, 456, 478, 483, 487, 500, 472; D30/42

(56) References Cited

U.S. PATENT DOCUMENTS

| | | | |
|---|---|---|---|
| D. 231,371 | * 4/1974 | Willinger et al. | 119/452 |
| 3,122,127 | * 2/1964 | Shechmeister et al. | 119/452 |
| 4,480,587 | * 11/1984 | Sedlacek | 119/419 |
| 4,640,228 | * 2/1987 | Sedlacek et al. | 119/419 |
| 4,763,607 | * 8/1988 | Tominaga | 119/452 |
| 4,953,502 | * 9/1990 | Hoover | 119/452 |
| 5,054,427 | * 10/1991 | Hoover | 119/452 |
| 5,092,269 | * 3/1992 | Phillips et al. | 119/452 |
| 5,134,969 | * 8/1992 | Mason et al. | 119/468 |
| 5,363,801 | * 11/1994 | Watters et al. | 119/452 |
| 5,431,129 | * 7/1995 | Clark | 119/468 |
| 5,577,464 | * 11/1996 | Wellington et al. | 119/452 |
| 5,865,144 | * 2/1999 | Semenuk | 119/456 |
| 6,044,799 | * 4/2000 | Tominaga | 119/472 |

* cited by examiner

Primary Examiner—Charles T. Jordan
Assistant Examiner—Judith A. Nelson
(74) Attorney, Agent, or Firm—Mason, Kolehmainen, Rathburn & Wyss

(57) ABSTRACT

A nesting box is provided for use with a metabolism cage. The nesting box comprises an enclosure for receiving a nesting dam. The enclosure has a top wall, a bottom wall and sidewalls. Either the top wall or one of the sidewalls includes an entrance/exit aperture. The entrance/exit aperture has a selected size that is selectively provided relative to a defined size of the nesting dam. The nesting box is formed of a substantially transparent material allowing observation of the nesting dam and pups without opening the box. The nesting box is adapted for use with different laboratory animals, such as mice, hamsters, gerbils, rats, guinea pigs, and rabbits.

20 Claims, 4 Drawing Sheets

NESTING BOX FOR EXCRETA COLLECTION FROM NESTING DAMS THROUGH PARTURITION AND LACTATION

CONTRACTUAL ORIGIN OF THE INVENTION

The United States Government has rights in this invention pursuant to Contract No. W-31-109-ENG-38 between the United States Government and the University of Chicago.

FIELD OF THE INVENTION

The present invention relates to a nesting box, and more particularly to, a nesting box for use with a metabolism cage to facilitate the collection of excreta from pregnant female laboratory animals or dams through pregnancy, parturition and lactation.

DESCRIPTION OF THE RELATED ART

Metabolism cages often are used to house animals used in laboratory studies. For example, in kinetic studies using animals, excreta can be analyzed for metabolites or metals. The collection of excreta from laboratory dams, such as mouse dams, through pregnancy, parturition, and lactation to the weaning of the young presents a challenge. The most practical method of fecal collection is to place the animal into a metabolism cage.

FIG. 1 illustrates a prior art arrangement 100 of a metabolism cage 102 together with a collection tray 104. The bottom 106 of the metabolism cage 102 is a grating that allows the fecal pellets to fall through to the tray for easy collection. However, the grating openings are large enough that the mouse pups from birth to about one week of age will also fall through, resulting in their death from exposure and lack of food.

SUMMARY OF THE INVENTION

A principal object of the present invention is to provide a nesting box for use with a metabolism cage. Other important objects of the present invention are to provide such nesting box substantially without negative effects and that overcome some of the disadvantages of prior art arrangements.

In brief, a nesting box is provided for use with a metabolism cage. The nesting box comprises an enclosure for receiving a nesting dam. The enclosure has a top wall, a bottom wall and sidewalls. Either the top wall or one of the sidewalls includes an entrance/exit aperture. The entrance/exit aperture has a selected size that is selectively provided relative to a defined size of the nesting dam.

In accordance with features of the invention, the nesting box facilitates the collection of excreta from laboratory dams through pregnancy, parturition and lactation. The nesting box is formed of a substantially transparent material allowing observation of the nesting dam without opening the box. The nesting box is adapted for use with different laboratory animals, such as mice, hamsters, gerbils, rats, guinea pigs, and rabbits.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 2:
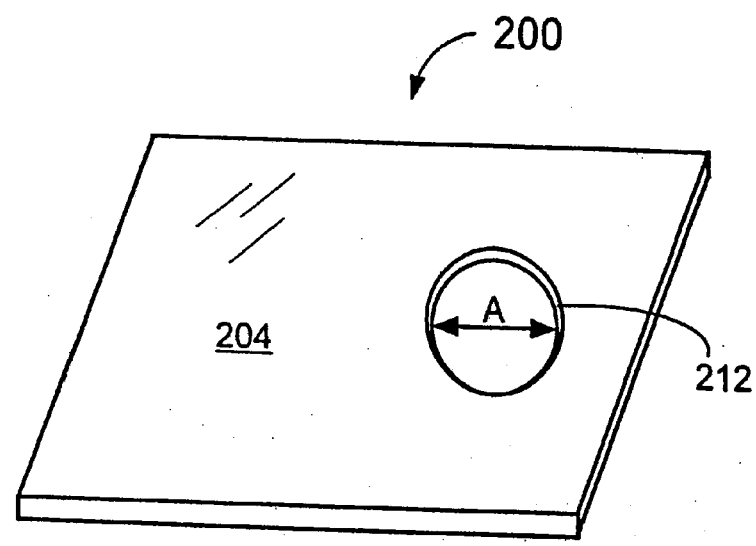
FIG. 2 is a diagram illustrating a nesting box arranged in accordance with the present invention.
Figure 2:
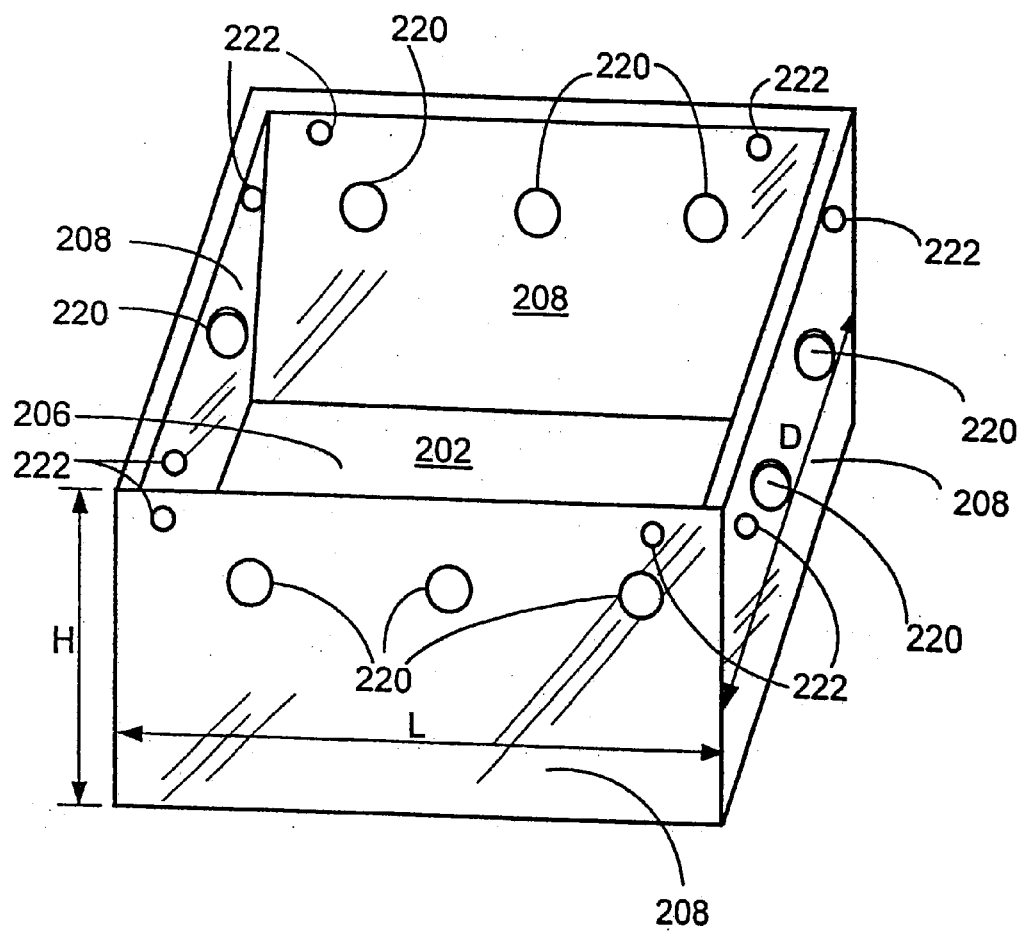

Having reference now to the drawings, in FIG. 2 there is shown a nesting box generally designated as 200 and arranged in accordance with the present invention. The nesting box 200 advantageously can be adapted for use with multiple different pregnant laboratory animals or dams. As shown in FIG. 2, the nesting box 200 has a generally rectangular shape. Nesting box 200 has a selected size for a particular type of laboratory animal.

Figure 1:
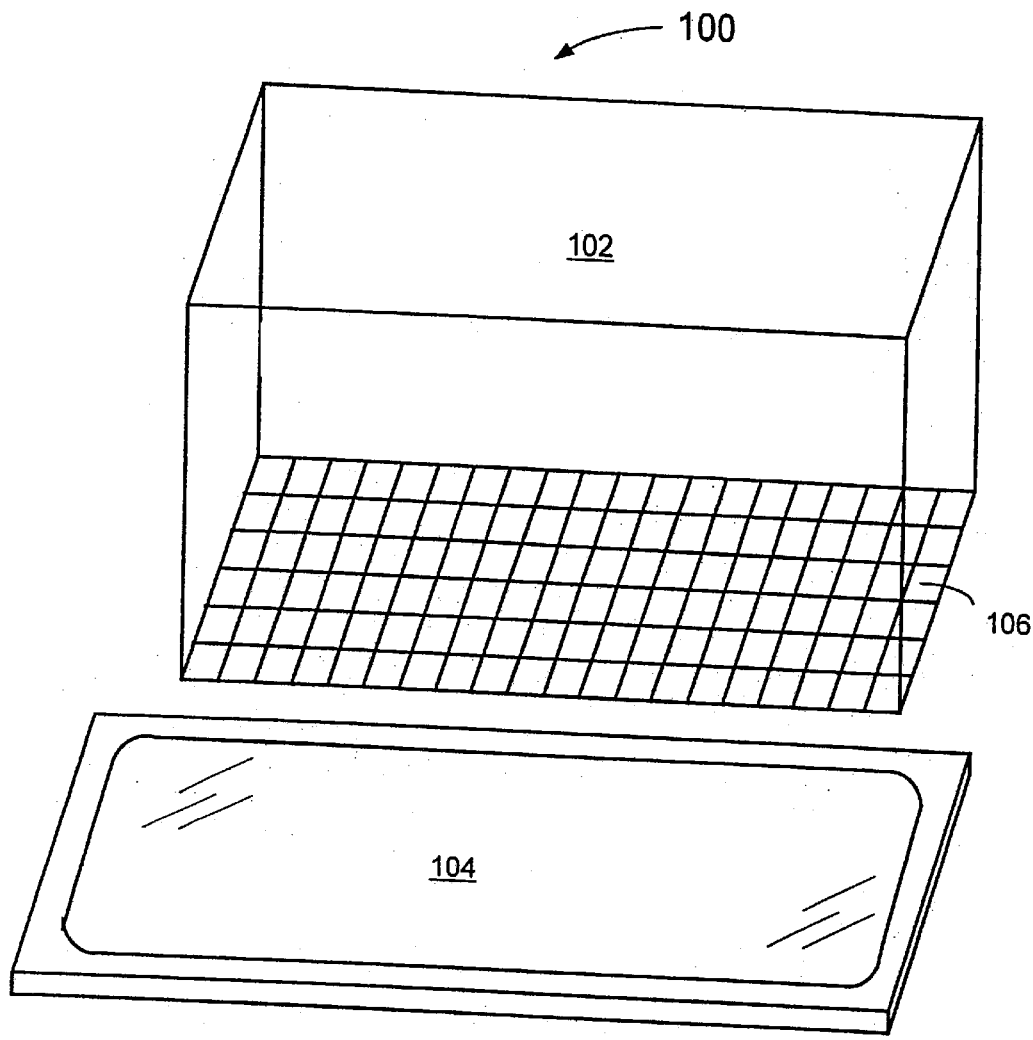
FIG. 1 is a diagram illustrating a prior art metabolism cage and collection tray.

In accordance with features of the invention, the nesting box 200 facilitates the collection of excreta during metabolic and pharmacokinetic studies from the female laboratory animals through pregnancy, parturition, and lactation to the weaning of the young pups. The nesting box 200 is placed in a metabolism cage 102, such as shown in FIG. 1, in which laboratory animals reside during metabolic studies. The dams deliver their pups inside the nesting box 200 and produced excreta outside the nesting box 200. The floor grating 106 of the metabolism cage 102 allows the fecal pellets to fall through to a collection tray 104 for easy collection.

The nesting box 200 includes an enclosure 202 having a removable top wall or lid 204, a bottom wall 206 and sidewalls 208. The nesting box 200 includes an entrance/exit or access opening 212 defined in the removable lid 204. The access opening 212 has a selected diameter that is provided relative to a defined size of a particular laboratory animal. The access opening 212 has a selected size to allow passage of the pregnant female but small enough that the nursing pups release their grip when the female exits the nesting box 200. The access hole 212 is positioned offset from center of the lid 204 toward one side to provide a covered nesting area for the dam at the other side of the nesting box 200. The combination of the location of the access opening 212 in the lid 204 and the access opening size is effective for releasing nursing pups from the dam on her exit from the box 200. It should be understood that a hinged lid 204 also could be used.

The side walls include a plurality of ventilation opening 220. Multiple small ventilation openings 220 can be formed or drilled in each vertical sidewall 208 to provide adequate ventilation to prevent the formation of condensation on the nesting box interior. A plurality of small openings 222 are provided in the sidewalls 208 to facilitate anchoring the nesting box 200 with a metabolism cage 102. Fasteners (not shown), such as ties, can be threaded through the openings 222 and metabolism cage 102 and tied to the metabolism cage 102.

As illustrated in FIG. 2, nesting box 200 has a length indicated by an arrow labeled L, a depth indicated by an arrow labeled D, a height indicated by an arrow labeled H and a diameter of the access opening 212 indicated by an arrow labeled A.

Nesting box 200 is formed, for example, by injection molding technique, of a substantially clear plastic material that is capable of withstanding high temperatures for sterilization. The removable top wall 204 is received in snap-fit engagement with the base enclosure 202. The removable top wall 204 can be formed of an opaque material and can include pigment for color coding of experiment groups. The nesting box 200 is substantially transparent and the lid 204 is removable, making it easy to observe the pups and the nesting dam. The top wall or lid 204 is removable for easy cleaning of the nesting box 200 after an experiment. A layer of cedar shavings or similar material (not shown) is used as nesting material on the bottom wall 206 of the nesting box 200.

Nesting box 200 has been tested with mice and allows quantitative collection of excreta from mouse dams. Nesting box 200 can also be adapted for use with rabbits, rats, guinea pigs, hamsters, gerbils, and other laboratory animals.

Figure 3:
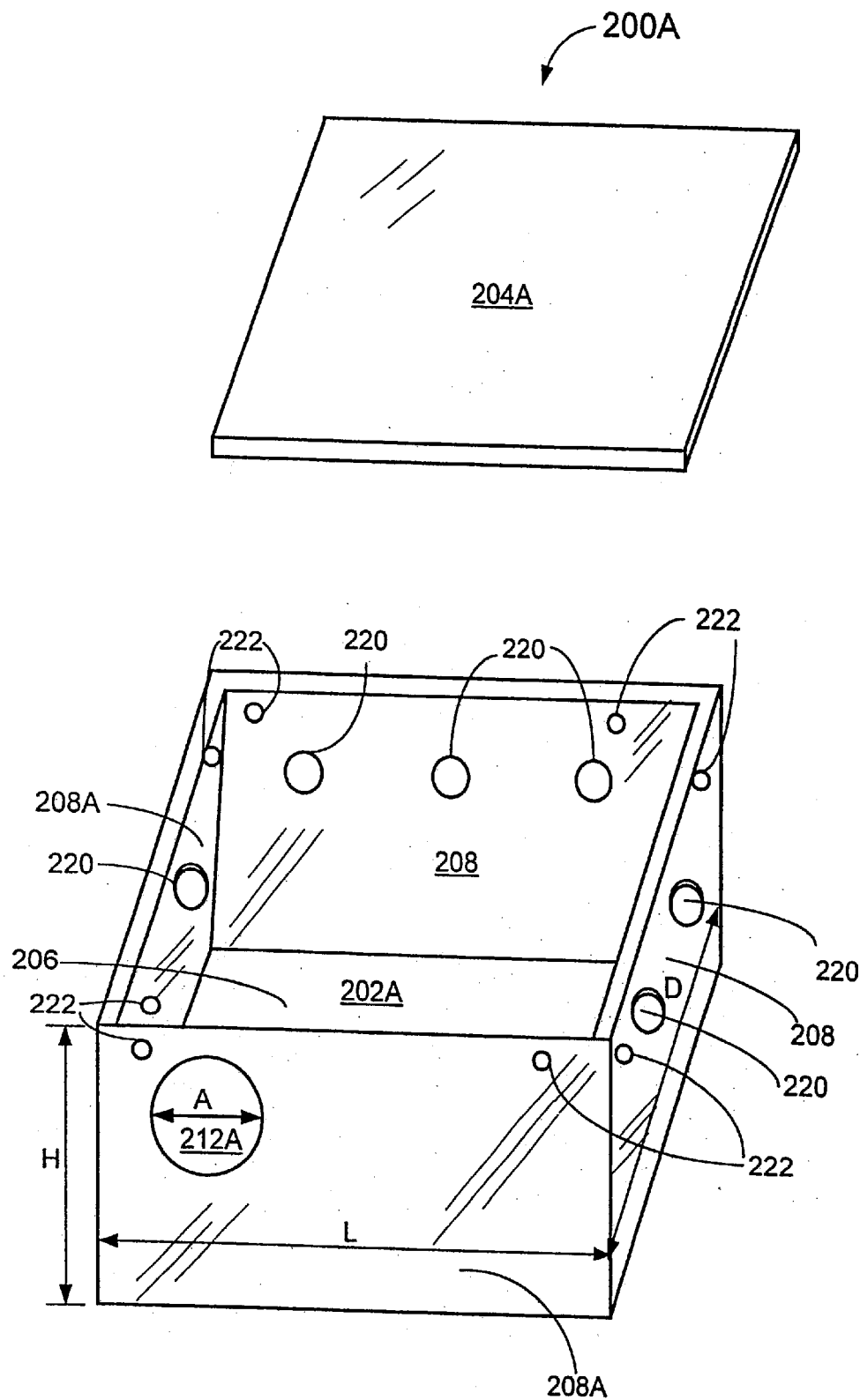
FIG. 3 is a diagram illustrating an alternative nesting box arranged in accordance with the present invention.
Figure 4:
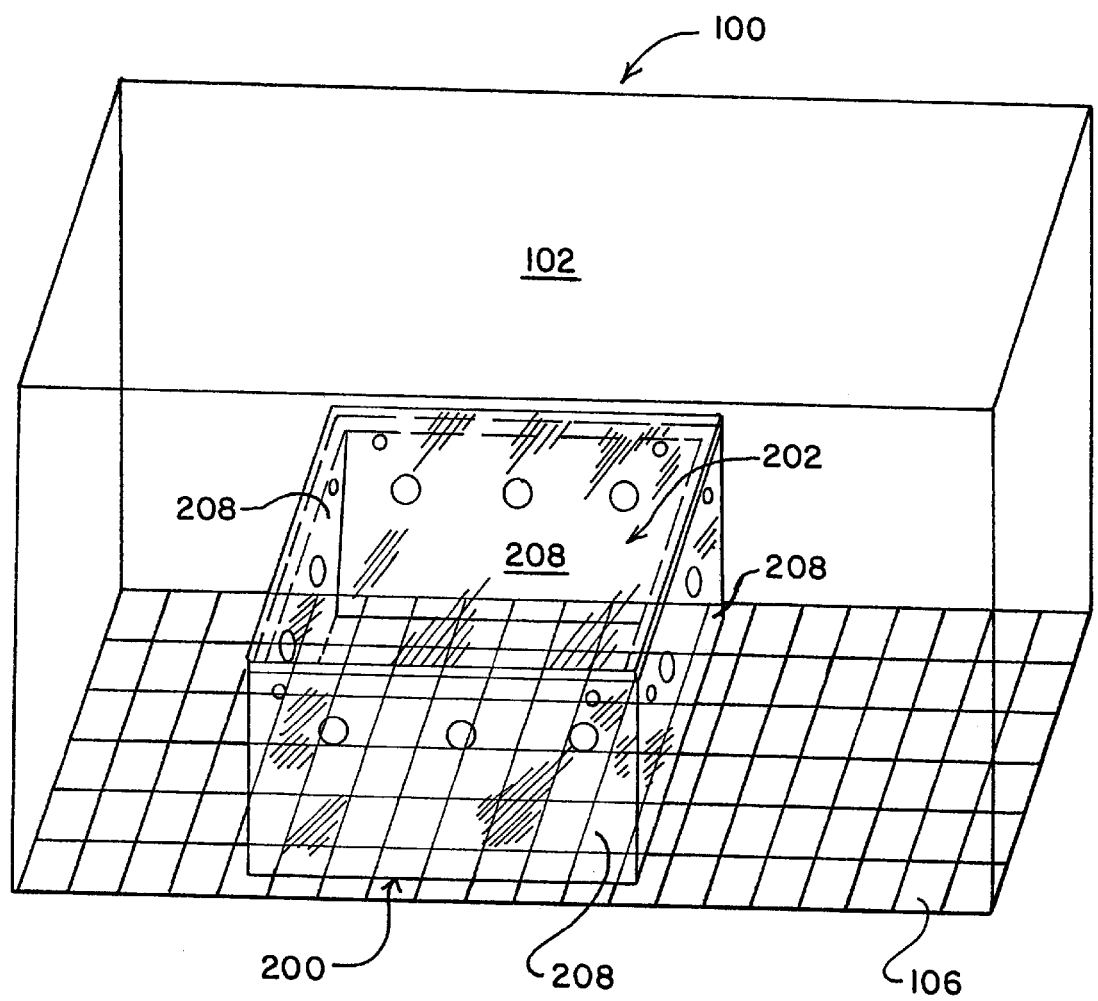
FIG. 4 illustrates the nesting box of FIG. 2 disposed within the metabolism cage of FIG. 1 (the lid of the nesting box is not shown for clarity purposes).

Referring now to FIG. 3, there is shown an alternative nesting box generally designated as 200A and arranged in accordance with the present invention. In FIG. 3, the same reference numbers as used with the nesting box 200 of FIG. 2 are used for similar or unchanged features of the nesting box 200A. In the nesting box 200A, an access opening 212A is defined in one of the sidewalls 208A of the enclosure 202A and is eliminated from the removable lid 204A. As shown in FIG. 3 the access opening 212A is provided in an upper portion of the one sidewall 208A to facilitate releasing nursing pups from the dam on her exit from the box 200A. The alternative nesting box 200A advantageously may be used with larger laboratory animals, such as the guinea pig and rabbit. While the access opening 212A is shown in the one sidewall 208A having a length L, it should be understood that an access opening could be provided in an upper portion of either of the sidewalls 208 having a depth D in accordance with the present invention.

The following TABLE 1 provides approximate dimensions for nesting boxes 200 of FIG. 2 and nesting boxes 200A of FIG. 3 for use with different laboratory animals.

TABLE 1

| LABORATORY ANIMAL | LENGTH (L) | DEPTH (D) | HEIGHT (H) | ACCESS HOLE DIAMETER (A) |
|---|---|---|---|---|
| MOUSE | 14 cm. | 10 cm. | 7 cm. | 4 cm. |
| HAMSTER | 18 cm. | 12 cm. | 10 cm. | 6 cm. |
| GERBIL | 18 cm. | 12 cm. | 10 cm. | 6 cm. |
| RAT | 35 cm. | 25 cm. | 20 cm. | 12 cm. |
| GUINEA PIG | 35 cm. | 25 cm. | 20 cm. | 12 cm. |
| RABBIT | 40 cm. | 30 cm. | 20 cm. | 15 cm. |

Nesting Box Testing

For one strain of mice having an average weight of 20 grams, one nesting box 200 that has been tested, has a length L of about 14 cm., a depth D of about 10 cm., and a height H of about 7 cm. with an access opening diameter A of about 4 cm.

All of the pregnant mice studied thus far delivered their pups inside the mouse nesting box 200 rather than on the mesh bottom 106 of the metabolism cage 100. Use of the nesting box 200 has enabled quantitative collection of excreta from the pregnant and lactating mice. Examination of the nesting material showed that almost all fecal excreta were produced outside of the nesting boxes 200. In addition, the female mice urinated exclusively outside the nesting box 200. Because excreta were produced outside the box 200, there was no contamination of the pups or nesting box with the bodily waste of the dam.

The tested mouse nesting box 200 (14 cm×10 cm×7 cm) was a largely transparent, rectangular polyethylene enclosure 202 with an opaque removable, snap-on lid 204. Small holes were drilled into each vertical side for ventilation, and the mouse entry/exit hole 212 was 4 cm. in diameter and located offset from center of the lid 204. Cedar shavings to about 2 cm. depth were placed in the mouse nesting box 200, providing nesting material for the dam during gestation and lactation. The size of the access hole 212 was such that the mouse dam could readily exit the box even in late gestation. During lactation, the lid and hole combination released nursing pups from the dam on her exit from the box 200. The holes 220 drilled into the vertical sides provided effective ventilation. The largely transparent plastic forming the mouse nesting box enclosure 202 allowed observation of the mouse dam and pups without opening the box, resulting in less disturbance of the dam during the early, critical days of lactation. The lid 204 of the nesting box 200 is removable for easy cleaning of the nesting box after the experiment.

Nesting box 200 has also been used as a post surgery recovery area for mice recovering from ovariectomies and sham-ovariectomies. Placing a still mildly sedated post-surgery mouse inside the nesting box 200 allowed the mouse to be returned safely to its metabolism cage 102 shortly after surgery. When the mouse had recovered enough coordination to exit the safety and shavings in the nesting box 200, the danger of hypothermia to the post-surgery animal from the metal cage floor 106 was past.

In brief, the nesting box 200 and the nesting box 200 A have an enormous use potential for pharmaceutical companies examining the effects of drugs using a laboratory animal. Using either the nesting box 200 or the nesting box 200A, drug metabolism and pharmacokinetic studies can easily be conducted with pregnant and lactating animals with no interruption during the time period when their young are neonates.

While the present invention has been described with reference to the details of the embodiments of the invention shown in the drawing, these details are not intended to limit the scope of the invention as claimed in the appended claims.

What is claimed is:

1. A nesting box for use with a metabolism cage having sidewalls and a grating floor comprising:

an enclosure for receiving a nesting dam, said enclosure having a top wall, a bottom wall and sidewalls, and being disposed within said sidewalls and grating floor of said metabolism cage, and said top wall including an entrance/exit aperture, said entrance/exit aperture having a selected size, said selected size being selectively provided relative to a defined size of the nesting dam.

2. A nesting box as recited in claim 1 wherein said enclosure is formed of a substantially transparent material.

3. A nesting box as recited in claim 1 wherein said enclosure includes ventilation apertures.

4. A nesting box as recited in claim 1 wherein said top wall of said enclosure is a removable member.

5. A nesting box as recited in claim 1 wherein said top wall is a snap-fit lid.

6. A nesting box as recited in claim 1 wherein said entrance/exit aperture is located offset from a center of said top wall.

7. A nesting box as recited in claim 1 wherein said enclosure is formed of a plastic material.

8. A nesting box as recited in claim 1 wherein said enclosure is formed of a polyethylene material.

9. A nesting box as recited in claim 1 wherein said selected size of said entrance/exit aperture has a ratio relative to said defined size of the nesting dam in a defined size of the nesting dam when pregnant.

10. A nesting box as recited in claim 1 wherein said entrance/exit aperture has a selected size in a range between 4 cm. and 15 cm. diameter.

11. A nesting box as recited in claim 1 wherein said entrance/exit aperture has a selected size of approximately 4 cm. for use with mice.

12. A nesting box as recited in claim 1 wherein said sidewalls have a height of approximately 7 cm. for use with mice.

13. A nesting box as recited in claim 1 wherein said entrance/exit aperture has a selected size of approximately 6 cm. for use with hamsters and gerbils.

14. A nesting box as recited in claim 1 wherein said entrance/exit aperture has a selected size of approximately 12 cm. for use with rats and guinea pigs.

15. A nesting box as recited in claim 1 wherein said enclosure includes anchoring apertures for anchoring the nesting box to the metabolism cage.

16. In combination with a metabolism cage having sidewalls and a grating floor, a nesting box to facilitate the collection of excreta from laboratory dams through pregnancy, parturition and lactation comprising:

an enclosure for receiving a nesting dam, said enclosure having a removable top wall, a bottom wall and sidewalls; said enclosure being disposed within said sidewalls and grating floor of said metabolism cage; and said enclosure being formed of a substantially transparent material; and said top wall including an entrance/exit aperture, said entrance/exit aperture having a selected size, said selected size being selectively provided relative to a defined size of the nesting dam.

17. A nesting box for use with a metabolism cage having sidewalls and a grating floor to facilitate the collection of excreta from laboratory dams through pregnancy, parturition and lactation comprising:

an enclosure for receiving a nesting dam, said enclosure having a removable top wall, a bottom wall and sidewalls; said enclosure being disposed within said sidewalls and grating floor of said metabolism cage; and said enclosure being formed of a substantially transparent material; and one of said sidewalls including an entrance/exit aperture, said entrance/exit aperture having a selected size, said selected size being selectively provided relative to a defined size of the nesting dam.

18. A nesting box as recited in claim 17 wherein said entrance/exit aperture is located offset from a center of said one sidewall.

19. A nesting box as recited in claim 17 wherein said enclosure includes ventilation apertures and wherein said entrance/exit aperture has a selected size of approximately 12 cm. for use with guinea pigs and wherein said entrance/exit aperture has a selected size of approximately 15 cm. for use with rabbits.

20. A nesting box as recited in claim 17 wherein said enclosure includes anchoring apertures for anchoring the nesting box to the metabolism cage.

\* \* \* \* \*